Dec. 30, 1924.
S. G. LEONARD
1,520,906
AUTOMATIC CONTROL SYSTEM FOR SYNCHRONOUS MOTOR GENERATOR SETS
Filed Jan. 8, 1923
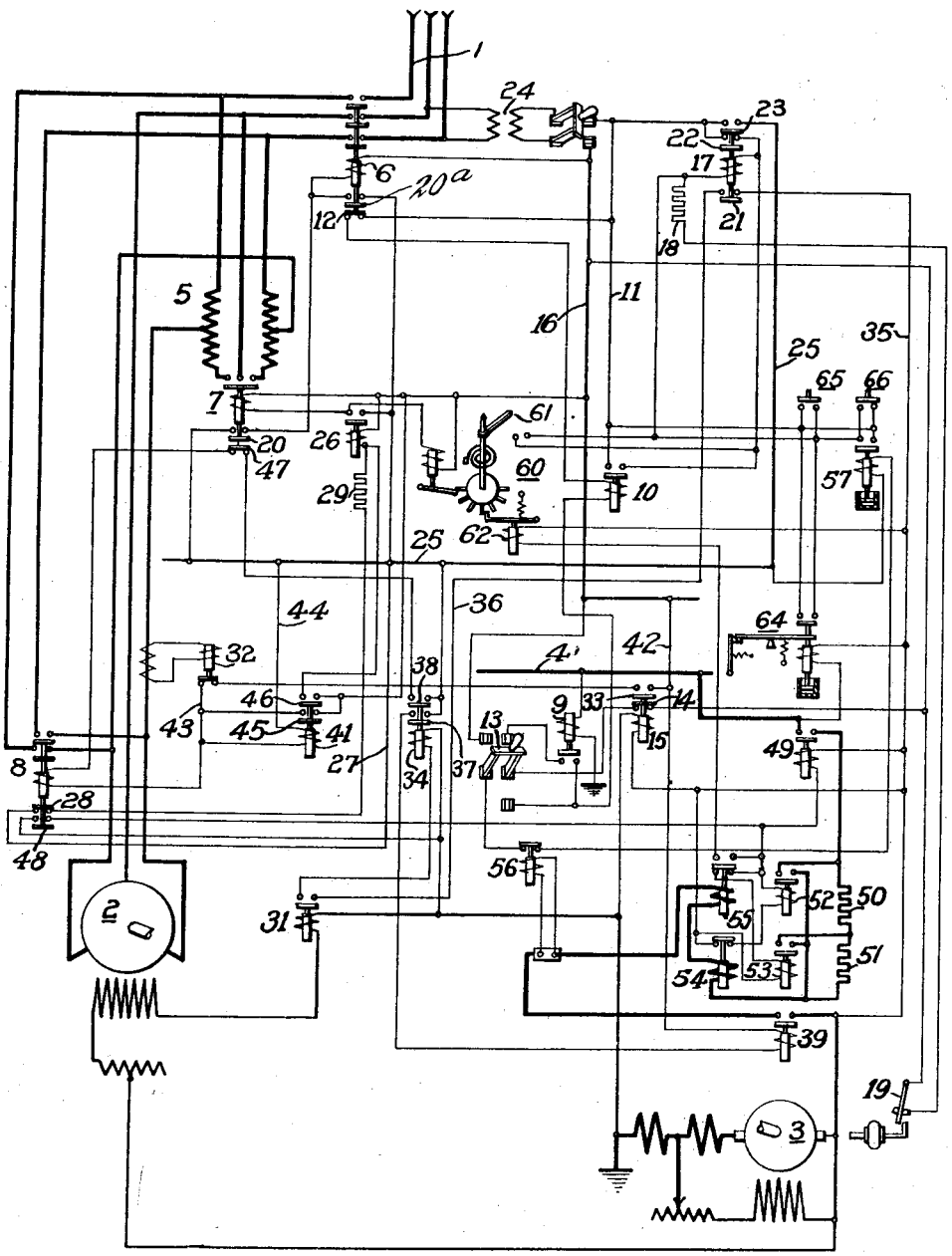
WITNESSES:
A. G. Schiefelbein
J. E. Foster
INVENTOR
Stuart G. Leonard.
BY
Wesley G. Carr
ATTORNEY Patented Dec. 30, 1924.

1,520,906

UNITED STATES PATENT OFFICE.

STUART G. LEONARD, OF GALION, OHIO, ASSIGNOR TO WESTINGHOUSE ELECTRIC & MANUFACTURING COMPANY, A CORPORATION OF PENNSYLVANIA.

AUTOMATIC CONTROL SYSTEM FOR SYNCHRONOUS MOTOR-GENERATOR SETS.

Application filed January 8, 1923. Serial No. 611,249.

*To all whom it may concern:*

Be it known that I, STUART G. LEONARD, a citizen of the United States, and a resident of Galion, in the county of Crawford and State of Ohio, have invented a new and useful Improvement in Automatic Control Systems for Synchronous Motor-Generator Sets, of which the following is a specification.

My invention relates to automatic stations and particularly to stations containing a synchronous motor-generator equipment.

One object of my invention is to provide a control system for a synchronous motor-generator unit that shall control the transition from starting to running voltage that is to be applied to the synchronous motor in accordance with the excitation of the field winding of the motor and the development of a predetermined voltage in the generator.

Another object of my invention is to provide means whereby, in a system in which a motor-generator unit is to be automatically connected, such automatic connection shall be precluded if the unit is not properly connected to the system after a predetermined number of starting operations.

Another object of my invention is to provide means whereby the transition from starting to running conditions in the motor shall be precluded if the voltage is developed in the generator in such direction that its polarity does not correspond to the polarity of a circuit to which it is to be connected.

In practicing my invention, I energize the field winding of the motor from the generator that is driven thereby and provide means responsive to the degree of excitation of the field winding and to the voltage developed in the generator to control the transition from the application of starting voltage to the application of normal voltage to the motor.

I further provide a voltage relay that is energized by the difference in potential between the generator and the direct-current circuit to which it is to be connected to preclude the transition from starting to running voltage if, for any reason, the generator polarity should be developed in the wrong direction.

I also provide a notching relay that is energized each time the starting voltage is applied to the synchronous motor which becomes effective to preclude further application of voltage to the motor if the control equipment associated therewith attempts to start the motor a predetermined number of times without completing the connection of the motor-generator unit to the system. Under normal conditions, when the generator is properly connected to the system, the notching relay is reset for subsequent operation.

The single figure of the accompanying drawings is a diagrammatic view of an electrical system, illustrating the arrangement of control apparatus for a motor-generator unit in accordance with my invention.

Referring to the drawings, energy is derived from a source 1 of electromotive force and supplied to a synchronous motor 2 and converted by means of a direct-current generator 3 to direct-current energy which is then supplied to a direct-current circuit 4.

In order to provide low potential energy to start the synchronous motor 2, a plurality of auto-transformers 5 are arranged to be energized through a main interrupter 6 and an auxiliary energizing or starting switch 7 which serves to operatively connect the auto-transformers 5 to the circuit. Low potential starting energy is thereupon impressed upon the motor through the auto-transformers and the motor is gradually accelerated to synchronous speed whereupon the starting switch is de-energized and a normal voltage-applying switch 8 is closed to apply normal operating voltage to the motor. The transition from starting to running is controlled by several devices that are responsive to proper conditions in the motor and in the generator, as will be hereinafter explained.

In order that the unit may be automatically started in response to a demand upon the direct-current circuit 4 for additional energy, a voltage relay 9 is provided to supply the initiating impulse.

When the voltage of the circuit 4 decreases to a predetermined value, thereby indicating a demand for additional energy on the circuit, the voltage relay 9 closes its switch to energize an auxiliary relay 10 from a control conductor 11 through an interlock switch 12 of the main switch 6, the operating coil of the relay 10, the switch of the voltage relay 9, the right-hand side of a manually-operable switch 13 and an interlock switch 14 of a voltage relay 15 to the other control conductor 16. The auxiliary relay 10 thereupon operates to close its switch.

The relay switch 10, when closed, completes the energizing circuit of a master relay 17 from the control conductor 11 through the operating coil of the master relay 17, a resistor 18 and a speed-limit switch 19, mounted on the shaft of the motor-generator unit, to the other control conductor 16. The master relay 17 thereupon operates to close its three switches 21, 22 and 23.

Switch 22, in closing, completes a holding circuit for the coil of the master relay 17 to maintain the master relay closed, irrespective of fluctuations of the voltage relay 9 and, consequently, of the auxiliary relay switch 10.

Switch 23 of the master relay 17, when closed, serves to energize an auxiliary control bus 25 from one terminal of a control transformer 24. Immediately after the energization thereof, a relay switch 26 is energized from the auxiliary conductor 25, through conductor 27, interlock switch 28 of the running voltage switch 8, a resistor 29 and the operating coil of the relay switch 26 to the other conductor 16. The relay switch 26 thereupon closes to connect the operating coil of the starting switch 7 between the control conductors 25 and 16. The switch 7 and the main interrupter 6 are thereupon closed to apply starting voltage to the motor 2 which gradually accelerates to synchronous speed.

Closing of the interrupter 6 is effected as soon as the switch 7 is closed, since its operating coil is connected to the control conductors 16 and 25 by an interlock switch 20 of the starting switch 7 that is closed when the switch 7 is closed. An interlock switch 20a of the interrupter 6 is connected in parallel relation to the interlock switch 20 to provide a holding circuit for the operating coil of the interrupter 6 after the switch 7 has opened.

In order to insure proper conditions of excitation of the field winding of the motor, a relay 31 is connected in series with the field winding across the terminals of the generator 3 to be energized therefrom.

The relay 15, previously referred to, is also connected across the terminals of the generator 3 to be energized in accordance with the voltage developed thereby. A current relay 32 responsive to a predetermined minimum value of starting current is also provided to co-operate with the field excitation relay 31 and the voltage relay 15 to control the transition from starting to running conditions. When the proper conditions of motor field excitation, generator voltage and minimum motor starting current are attained, transfer is made from starting to running conditions to permit the motor to assume the load.

When the voltage of the generator 3 attains a predetermined value, the voltage relay 15 opens its switch 14 and closes its switch 33. As the field winding of the motor becomes energized to a predetermined degree, thereby also indicating that the circuit of the field winding is complete, the field relay 31 closes. Similarly, the minimum current relay 32 closes, the motor having attained synchronous speed.

The switch 21 of the master relay 17 co-operates with the field relay switch 31 to energize an auxiliary relay 34. This circuit may be traced from the ungrounded or positive terminal of the generator through conductor 35, switch 21 of the master relay 17, conductor 36, switch of field relay 31 and the operating coil of auxiliary relay 34 to the grounded or negative terminal of the generator. The relay 34 is thereupon energized to close its switches 37 and 38.

Switch 37 serves to close a switch 39 that is disposed between the positive terminal of the generator and the circuit 4. Switch 38 of the relay 34 co-operates with other switches to complete the circuit of the operating coil of the running switch 8 in a manner to be hereinafter described.

When the voltage relay 15 operated to close switch 33 and the minimum starting current relay 32 closed its switch, these switches co-operated to energize a transfer relay 41 by connecting the operating coil thereof between the control conductors 16 and 25 through conductors 42, 43 and 44.

Transfer relay 41, when energized, closes its two switches 45 and 46. Switch 45 closes to maintain a holding circuit for the operating coil of its relay, independent of subsequent operation of the relays 32 and 15. Switch 46, in closing, short-circuits the operating coil of the starting switch control relay 26, thereby de-energizing that relay and, consequently, de-energizing the starting voltage switch 7.

The starting switch 7, in opening, opens its interlock switch 20 and closes its interlock switch 47. Switch 47, in closing, co-operates with switch 38 of the relay 34 previously referred to and controlled by the field relay 31, and the switch 45 of the transfer relay 41 to connect the operating coil of the running switch 8 between the control conductors 16 and 25. This circuit may be traced from the conductor 25 through the switch 38 of the relay 34, the switch 47 of the starting switch 7, the operating coil of the running switch 8, and the switch 45 of the transfer relay 41 to the control conductor 16. The running switch 8 is now closed to impress operating voltage on the motor.

The circuit of the running switch 8 is therefore maintained energized so long as the relay 34 maintains its switch 38 closed. Since the energization of the relay 34 depends upon the energization of the field relay 31, the running switch 8 will be opened upon the occurrence of any condition that will effect the de-energization of the field relay 31, such as an open circuit tending to de-energize the field winding of the motor. The running switch 8, upon closing, opens its interlock switch 28 and closes another interlock switch 48.

The interlock switch 48, in closing, controls the connection of the generator to the circuit 4 by the main direct-current switch 49. The generator 3 is now connected to the direct-current circuit 4 through the switches 39 and 49 and through two res'stors 50 and 51 that are provided to preclude an exchange of excessive currents between the generator and the circuit 4. Upon the connection of the generator to the circuit 4, if conditions are normal, current will be supplied to the circuit depending upon the load demand and the values of the resistors 50 and 51. Under normal conditions, the resistors are adapted to be short-c'rcuited to eliminate their effect.

Two short-circuiting switches 52 and 53 are provided to short-circuit the resistors 50 and 51. The switches 52 and 53 are controlled by two series current relays 54 and 55, respectively, that are energized under all conditions by the current supplied to the c'rcuit 4 by the generator 3. The current relays 54 and 55 are so adjusted that the relay 54 closes its switch at a lower value of current than that at which the relay 55 closes its lower switch.

If the current that is supplied by the generator 3 to the circuit 4, when the switch 49 is closed, exceeds a predetermined value, the energization of the current relays 54 and 55 is sufficient to cause the relay 54 to open its switch and the relay 55 to open its lower sw:tch and to close its upper switch. When the current falls below the value at which the relay 55 is adjusted to operate, however, this relay opens its upper switch and closes its lower switch to effect energization of the operating coil of the short-circuiting switch 53. The switch 53 is thereupon closed to short-circuit the res'stor 51, thereby eliminating its current-limiting effect.

If the current is now below the value at which the current relay 54 is adjusted to operate, this relay will close its switch to energize the operating coil of the short-circuit ng switch 52. The switch 52 is thereupon closed to short-circuit both of the resistors 50 and 51 and to cause the generator to supply current directly to the circuit 4.

Whenever the current traversing the current relays 54 and 55 exceeds the value at which the relay 54 is adjusted to operate, this relay will open its switch to de-energize the operating coil of the short-circuit ng switch 52. The switch 52 is thereupon opened to cause the resistor 50 to be reinserted in the circuit between the generator 3 and the circuit 4, thereby reducing the current that is supplied to the circuit 4. If th's current is now in excess of the value at which the relay 55 is adjusted to operate, this relay will open its lower switch to cause the resistor 51 also to be reinserted in the circuit and to limit the current suppl:ed by the generator 3.

When the demand for energy decreases to or below a predetermined value at which it is desired that the motor generator shall not operate to supply energy to the direct-current circuit, and such condition prevails for a predetermined interval of time ind:cating that it is not a temporary switching of load, a current relay 56 is rendered operative to co-operate with a timing relay 57 to disconnect the unit from the system by short-circuiting the operat'ng coil of the master relay 17. The control apparatus is thereupon de-energized and the unit disconnected from the system.

If, for any reason, the transition from starting to running conditions cannot be successfully effected within the interval of time controlled by the timing relay 57, the master relay will be similarly de-energized and a continued demand for power will, of course, again tend to attempt to initiate the operation of the control apparatus to start the unit. Such abnormal conditions might be, for example, a phase reversal, causing the motor to rotate in a reverse direction and thereby precluding the proper development of voltage in the generator, or open-circuit connect:ons somewhere in the main circuits or in the circuits of the control apparatus.

Under such conditions, it is desirable to preclude further operation of the master relay after a predetermined number of starting operations have been attempted. To this end, I provide a notching relay 60 which is energized and moved forward each t'me the auxiliary control relay 26 operates to energize the starting switch 7. If a predetermined number of starting operations should be effected but not the complete connection of the motor-generator unit to the system, the notching relay 60 would be actuated to a position at which its switch 61 would be closed to short-c'rcuit the operating coil of the master relay 17, thereby preventing its energization to initiate the starting apparatus.

When, however, the apparatus is normal and operates properly to connect the motor-generator unit to the system, a reset coil 62 is energized when the current relay 55 closes its upper switch in response to the current that traverses its operating coil when the switch 49 is closed to connect the generator to the circuit 4. The relays 54 and 55 will always operate momentarily, at least, when the switch 49 closes, on account of the momentary rush of current. The reset coil 62 is thereupon energized through the upper switch of the relay 55 and the interlock switch 48 of the running switch 8 to permit the latching relay 60 to assume its initial position and to be available for subsequent operation.

In order to preclude the connection of the generator to the direct-current circuit if, for any reason, its voltage should be developed with the polarity thereof in a reverse sense relative to that of the direct-current circuit 4, I provide a voltage relay 64 which is adjusted to operate at a predetermined value in excess of the normal operating voltage of the generator. Thus, if the voltage of the generator is developed in the wrong direction, the potential difference between the generator and the direct-current circuit 4 will be the sum of the voltages of the generator and of the circuit, and the relay will operate to short-circuit the operating coil of the master relay 17 and will maintain such short-circuit until manually reset by an attendant.

Other protective devices may be provided as desired to protect the operation of the unit against operation under abnormal conditions and switches operated by such protective devices corresponding to switches 65 and 66 may be provided to short-circuit the operating coil of the master relay 17 to disconnect the unit from the system either temporarily or permanently until an attendant may visit the station to rectify the cause of the abnormal condition.

My invention therefore comprehends, in a system of the character described, a determination of proper conditions of field excitation for the motor and the development of proper voltage, both in value and in direction, in the generator for controlling the transition from starting to running voltage to be applied to the synchronous motor.

My invention also comprehends means for precluding the effectiveness of continued starting impulses to initiate the starting apparatus when a predetermined number of consecutive impulses fail to properly connect the motor-generator unit to the system.

My invention is not limited to the specific structure illustrated nor to the particular arrangement thereof, as it may be variously modified without departing from the spirit and scope of my invention, as set forth in the appended claims.

I claim as my invention:

1. The combination with an alternating-current circuit, a direct-current circuit and a motor-generator unit to be connected therebetween, the motor being provided with a field winding, of means for consecutively applying reduced starting and normal operating voltage to the motor, and means responsive to the development of a predetermined voltage in the generator and to a predetermined degree of excitation of the motor field winding for controlling the transfer from starting to running voltage application.

2. The combination with an alternating-current circuit, a direct-current circuit and a motor-generator unit to be connected therebetween, the motor being provided with a field winding, of means for consecutively applying reduced starting and normal operating voltage to the motor, means for energizing the field winding of the motor from the generator, means responsive to the excitation of the field winding and co-operating means responsive to the generator voltage for consecutively controlling the transfer from applied starting to running voltage and the connection of the generator to the direct-current circuit.

3. The combination with an alternating-current circuit, a direct-current circuit and a motor-generator unit to be connected therebetween, the motor being provided with a field winding, of means for consecutively applying reduced starting and normal operating voltage to the motor from the alternating-current circuit, means for connecting the generator to the direct-current circuit and means dependent upon the motor field excitation, and the proper generator voltage for controlling in sequence the transfer from starting to running voltage and the actuation of the connecting means between the generator and the direct-current circuit.

4. The combination with an alternating-current circuit, a direct-current circuit and a motor-generator unit to be connected therebetween, the motor being provided with a field winding, of means for consecutively applying reduced starting and normal operating voltage to the motor from the alternating-current circuit, said means comprising a transfer relay, a relay responsive to the voltage of the generator for controlling the transfer relay and a relay responsive to the excitation of the field winding of the motor co-operating with the transfer relay to control the operation of the normal-voltage applying means.

5. The combination with a synchronous motor-generator unit and means for consecutively applying reduced starting and normal operating voltages to the motor, of means for controlling the transfer from reduced starting to normal operating voltage comprising co-operating means responsive to a predetermined minimum value of starting current, to a predetermined degree of excitation in the field winding of the motor and to a predetermined voltage of the generator.

6. The combination with an alternating-current circuit, a direct-current circuit, a synchronous motor-generator unit to be connected therebetween and connecting means between the motor-generator unit and both circuits, of means responsive to the difference in potential between the generator and the direct-current circuit for controlling the connecting means between the motor-generator unit and both circuits.

7. The combination with an alternating-current circuit, a direct-current circuit, a synchronous motor-generator unit to be connected therebetween and connecting means between the motor-generator unit and both circuits, of means comprising a single winding connected between the generator and the direct-current circuit for controlling the connection of the motor-generator between both circuits.

8. The combination with an alternating-current circuit, a direct-current circuit, a synchronous motor-generator unit to be connected therebetween and connecting means between the motor-generator unit and both circuits, of a relay comprising a single winding connected between the generator and the direct-current circuit, means for controlling the connecting means between the motor-generator unit and the two circuits, and means whereby said relay is rendered effective to preclude the operation of the controlling means if the generator voltage exceeds a predetermined value.

9. The combination with an alternating-current circuit, a direct-current circuit, a synchronous motor-generator unit to be connected therebetween and connecting means between the motor-generator unit and both circuits, of a relay comprising a single winding connected between the generator and the direct-current circuit, means for controlling the connecting means between the motor-generator unit and the two circuits, and means for rendering the relay effective to preclude operation of the controlling means under improper voltage conditions in the generator and for rendering the relay ineffective when proper voltage conditions obtain in the generator.

10. The combination with an alternating-current circuit, a direct-current circuit, a synchronous motor-generator unit and means for connecting the unit to both circuits, of means for controlling the connection of the generator to the direct-current circuit comprising means dependent upon the motor attaining synchronous speed and the field winding being sufficiently energized to permit the assumption of load by the motor and means dependent upon proper voltage conditions in the generator.

11. The combination with two electric circuits and a translating device for transferring energy from one circuit to the other, of a plurality of relay devices normally operative in a predetermined sequence to connect the translating device between the two circuits, a relay for initiating operation of said relay devices, means responsive to an abnormal or improper condition for precluding the complete connection of the translating device between the two circuits and means for precluding further effectiveness of the initiating relay after a predetermined number of unsuccessful attempts to connect the translating device between the two circuits.

12. The combination with two electric circuits and a translating device for transferring energy from one circuit to the other, of a plurality of relay devices normally operative in a predetermined sequence to connect the translating device between the two circuits, a counter operated early in the sequence and effective to preclude further operation of the relay devices after a predetermined number of unsuccessful attempts to connect the translating device between both circuits.

13. The combination with two electric circuits and a translating device for transferring energy from one circuit to the other, of a plurality of relay devices normally operative in a predetermined sequence to connect the translating device between the two circuits, a counter operated early in the sequence and effective to preclude further operation of the relay devices after a predetermined number of unsuccessful attempts to connect the translating device between both circuits, and means controlled by the final relay device in the sequence for resetting the counter for subsequent operation.

In testimony whereof, I have hereunto subscribed my name this fourth day of January, 1923.

STUART G. LEONARD.